(12) United States Patent
King et al.

(10) Patent No.: US 8,397,551 B2
(45) Date of Patent: Mar. 19, 2013

(54) PASSIVE BLAST PRESSURE SENSOR

(75) Inventors: Michael J. King, Livermore, CA (US); Roberto J. Sanchez, Pleasanton, CA (US); William C. Moss, San Mateo, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 266 days.

(21) Appl. No.: 12/770,983

(22) Filed: Apr. 30, 2010

(65) Prior Publication Data

US 2010/0275676 A1    Nov. 4, 2010

Related U.S. Application Data

(60) Provisional application No. 61/174,177, filed on Apr. 30, 2009.

(51) Int. Cl.
*G01L 5/14*     (2006.01)
(52) U.S. Cl. ............................ 73/35.14; 73/491; 116/203
(58) Field of Classification Search .................. 116/203; 73/35.14, 491, 492
See application file for complete search history.

(56) References Cited

U.S. PATENT DOCUMENTS

| | | | | |
|---|---|---|---|---|
| 2,543,732 A * | 2/1951 | Shultz | ........................... | 73/35.14 |
| 2,601,778 A * | 7/1952 | Gordon | ........................... | 73/35.14 |
| 2,875,352 A * | 2/1959 | Orlacchio | ....................... | 310/338 |
| 2,976,732 A * | 3/1961 | Hautly | ........................... | 116/203 |
| 3,071,973 A * | 1/1963 | Helfand | ........................... | 73/492 |
| 3,623,449 A * | 11/1971 | Knutson | ....................... | 116/203 |
| 3,765,025 A * | 10/1973 | Zietzke et al. | ....................... | 346/7 |
| 3,811,401 A | 5/1974 | Piquerez | | |
| 4,068,613 A * | 1/1978 | Rubey | ........................... | 116/203 |
| 4,078,423 A * | 3/1978 | Ogata et al. | ................. | 73/862.53 |
| 4,125,085 A * | 11/1978 | Rubey | ........................... | 116/203 |
| 4,164,196 A * | 8/1979 | Stradella et al. | ............... | 116/272 |
| 4,237,736 A * | 12/1980 | Wright | ........................... | 73/492 |
| 4,499,846 A * | 2/1985 | Bergeron et al. | ............. | 116/272 |
| 4,787,246 A * | 11/1988 | Komatsu et al. | ................. | 73/492 |
| 5,014,786 A * | 5/1991 | Kobayashi | ..................... | 116/272 |
| 5,323,729 A | 6/1994 | Rubey | | |

(Continued)

FOREIGN PATENT DOCUMENTS

WO    2009070886 A1    6/2009
WO    2009121000 A2    10/2009

OTHER PUBLICATIONS

Cheriyan, et al., "Pervasive Embedded Systems for Detection of Traumatic Brain Injury", IEEE, ICME, pp. 1704-1707 (2009).

(Continued)

*Primary Examiner* — Lisa Caputo
*Assistant Examiner* — Punam Roy
(74) *Attorney, Agent, or Firm* — James S. Tak

(57) ABSTRACT

A passive blast pressure sensor for detecting blast overpressures of at least a predetermined minimum threshold pressure. The blast pressure sensor includes a piston-cylinder arrangement with one end of the piston having a detection surface exposed to a blast event monitored medium through one end of the cylinder and the other end of the piston having a striker surface positioned to impact a contact stress sensitive film that is positioned against a strike surface of a rigid body, such as a backing plate. The contact stress sensitive film is of a type which changes color in response to at least a predetermined minimum contact stress which is defined as a product of the predetermined minimum threshold pressure and an amplification factor of the piston. In this manner, a color change in the film arising from impact of the piston accelerated by a blast event provides visual indication that a blast overpressure encountered from the blast event was not less than the predetermined minimum threshold pressure.

15 Claims, 5 Drawing Sheets

U.S. PATENT DOCUMENTS

| | | | | |
|---|---|---|---|---|
| 5,435,178 | A * | 7/1995 | Edwards | 73/170.15 |
| 5,731,523 | A * | 3/1998 | Cusumano et al. | 73/783 |
| 6,065,158 | A | 5/2000 | Rush, III | |
| 6,301,718 | B1 * | 10/2001 | Rigal | 2/411 |
| 6,848,389 | B1 * | 2/2005 | Elsasser et al. | 116/203 |
| 6,925,887 | B1 | 8/2005 | Coffey et al. | |
| 7,311,009 | B2 | 12/2007 | Kotovsky | |
| 7,509,835 | B2 | 3/2009 | Beck | |
| 7,644,605 | B2 * | 1/2010 | Kaito | 73/12.01 |
| 7,975,527 | B2 * | 7/2011 | Manahan | 73/35.14 |
| 2003/0136009 | A1 * | 7/2003 | McNeill | 30/361 |
| 2007/0039383 | A1 * | 2/2007 | Dip | 73/149 |
| 2009/0284381 | A1 * | 11/2009 | Manahan | 340/590 |
| 2010/0005571 | A1 | 1/2010 | Moss et al. | |
| 2010/0039256 | A1 * | 2/2010 | Manahan | 340/540 |
| 2010/0229784 | A1 * | 9/2010 | Bayne et al. | 116/203 |
| 2010/0242830 | A1 * | 9/2010 | Manahan | 116/203 |

OTHER PUBLICATIONS

Francoeur, "Applications: Blast Strips Record Explosion Exposure", Photonics.com, 2 pages (Jan. 1, 2009).

Murray, "Army Using Sensors to Build Better Helmets", Design News, 2 pages (2008).

* cited by examiner

PASSIVE BLAST PRESSURE SENSOR

CLAIM OF PRIORITY IN PROVISIONAL APPLICATION

This application claims priority in provisional application filed on Apr. 30, 2009, entitled "Single Use Passive Blast Pressure Sensor" Ser. No. 61/174,177, by Michael J. King et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to blast pressure sensors, and in particular to a passive blast pressure sensor for detecting blast overpressures with magnitudes not less than a predetermined minimum threshold pressure and having a visual indicator for indicating when the sensor is triggered.

BACKGROUND OF THE INVENTION

Blasts from high explosive detonations are endemic in military combat. They are characterized by a rapidly moving pressure/shock wave (often exceeding ~330 meters per second in air) with a blast overpressure (i.e. magnitude of the moving pressure wave measured as a pressure difference $\Delta p$ over and above a normal atmospheric/ambient pressure) which can be several atmospheres greater than ambient pressure. If blast overpressure exceeds certain pressure or duration thresholds, such blasts can cause neuro-psychological or physiological injury or death to exposed soldiers and civilians. In particular, blast-induced traumatic brain injury ("biTBI") can result from mechanical loads in the brain, often without skull fracture, which can cause complex, long lasting symptoms.

Diagnosis of biTBI is problematic because precise biological damage thresholds are not currently known, and blast exposure is affected significantly by a blast victim's (e.g. soldier's) local environment. For example, blast exposure in an unconfined space is much less severe than in an enclosed space, or near a wall or interior corner, and can also differ from conditions inside a vehicle. Consequently, it is difficult to determine the severity of the blast wave to which a blast victim has been exposed. This makes determination of biological damage thresholds from field injury data challenging. And even if these thresholds were known, they cannot be used to diagnose biTBI unless the exact blast conditions experienced by a particular individual can be measured. The objective determination of the severity of blast effects requires assessment during the exposure.

Objective determination of how large a blast a victim had been exposed to would be valuable to combat medics or other first responders attempting to render aid to the victim on the battlefield, and also to doctors and other professionals responsible for the medium and long term care of the victim. Furthermore, improved measurement of blast exposure would allow more rapid and accurate diagnosis of blast-related injuries (i.e. injury symptoms to be better correlated with mechanical insult) and could potentially lead to improved treatment techniques for blast victims or the design of improved protective armor or equipment.

SUMMARY OF THE INVENTION

One aspect of the present invention includes a blast pressure sensor for detecting blast overpressures of at least a predetermined minimum threshold pressure, said blast pressure sensor comprising: a base with a strike surface; a cylinder barrel having a cylinder bore with a first bore end open to a blast event monitored medium and a second bore end bounded by the strike surface; a piston movably guided in the cylinder bore and having a first piston end with a detection surface exposed to the blast event monitored medium via the first bore end, and a second piston end with a striker surface adjacent the second bore end, wherein a ratio of an effective cross-sectional area of the detection surface of the first piston end to an effective cross-sectional area of the striker surface of the second piston end defines an amplification factor; and a contact stress sensitive film positioned between the strike surface of the base and the striker surface of the second piston end and which changes color in response to at least a predetermined minimum contact stress defined as a product of the predetermined minimum threshold pressure and the amplification factor, whereby a blast event which accelerates the piston to impact the film against the strike surface with at least the predetermined minimum contact stress induces a color change in the film providing visual indication that a blast overpressure encountered from the blast event was not less than the predetermined minimum threshold pressure.

Another aspect of the present invention includes a blast pressure sensor for detecting blast overpressures of at least a predetermined minimum threshold pressure, said blast pressure sensor comprising: a cylinder barrel having a cylinder bore with first and second open bore ends; a piston movably guided in the cylinder bore and having a first piston end with a detection surface exposed through the first open bore end and a second piston end with a striker surface adjacent the second open bore end, wherein a ratio of an effective cross-sectional area of the detection surface of the first piston end to an effective cross-sectional area of the striker surface of the second piston end defines an amplification factor; a contact stress sensitive film which changes color in response to at least a predetermined minimum contact stress defined as a product of the predetermined minimum threshold pressure and the amplification factor; and means for securing the cylinder barrel to a rigid body so that the film is positioned between a strike surface of the rigid body and the striker surface of the second piston end and the first open bore end is open to a blast event monitored medium; whereby a blast event which accelerates the piston to impact the film against the strike surface with at least the predetermined minimum contact stress induces a color change in the film providing visual indication that a blast overpressure encountered from the blast event was not less than the predetermined minimum threshold pressure.

Another aspect of the present invention includes a blast pressure sensor apparatus comprising: a plurality of blast pressure sensors, each sensor for detecting blast overpressures of at least a corresponding predetermined minimum threshold pressure and each sensor comprising: a base with a strike surface; a cylinder barrel having a cylinder bore with a first bore end open to a blast event monitored medium and a second bore end bounded by the strike surface; a piston movably guided in the cylinder bore and having a first piston end with a detection surface exposed to the blast event monitored medium via the first bore end, and a second piston end with a striker surface adjacent the second bore end, wherein a ratio of an effective cross-sectional area of the detection surface of the first piston end to an effective cross-sectional area of the striker surface of the second piston end defines an amplification factor; and a contact stress sensitive film positioned between the strike surface of the base and the striker surface of the second piston end and which changes color in response to at least a predetermined minimum contact stress defined as a product of the corresponding predetermined minimum threshold pressure of the sensor and the amplification factor, whereby a blast event which accelerates the piston to impact the film against the strike surface with at least the predetermined minimum contact stress induces a color change in the film providing visual indication that a blast overpressure encountered from the blast event was not less than the corresponding predetermined minimum threshold pressure of the sensor, and wherein the respective predetermined minimum threshold pressures of the sensors are different from each other so as to provide visual indication that the blast overpressure encountered from the blast event is less than a lowest predetermined minimum threshold pressure of all non-responsive sensors, if any, but not less than a highest predetermined minimum threshold pressure of all responsive sensors, if any.

Generally, the present invention is directed to a passive blast pressure sensor designed to detect blast overpressures that are at least (i.e. not less than) a predetermined minimum threshold pressure, and to provide visual indication of the threshold detection in an easy and quick to read format. The blast pressure sensor generally has a pneumatic piston-cylinder construction that transforms fluid pressure from a blast event into contact stress that is measured using contact stress sensitive film of a type which changes color in response to a predetermined minimum contact stress. By making at least the piston portion of the sensor out of a transparent material (such as for example acrylic) the change in color of the film can be easily observed. The color change visual indications produced by the sensors would enable first responders and other medical personnel to quickly assess the magnitude and severity of a blast to which a service member was exposed to provide appropriate treatment. Furthermore, the visual indications can further aid in correlating resulting symptoms/injuries with blast exposure.

The predetermined minimum threshold pressure for a particular sensor may be chosen based on known or estimated damage thresholds (e.g. non-lethal blast exposure levels) for humans. In the alternative, damage threshold estimates may be from available literature on animal tests. In any case, since each sensor is designed to trigger at a predetermined minimum threshold pressure particularly specified for the sensor, this parameter may be used to identify the particular gauge of a blast pressure sensor. For example, a 10 psi or 10-gauge blast pressure sensor would be a sensor designed to detect, i.e. be triggered by, blast overpressures greater than or equal to 10 psi.

The pneumatic piston-cylinder arrangement of the sensor includes a piston (also characterized as a pressure button) movably guided in a cylinder bore of a cylinder barrel (also characterized as a retaining ring or collar for retaining the pressure button), where one end of the bore is open to a medium to be monitored for blast events (i.e. blast event monitored medium) and the other end of the bore is bounded by a strike surface of a rigid body (which may be a base or back plate provided as part of the sensor, or an object or location not provided as part of the sensor from which the medium is monitored). The piston has a first piston end with a detection surface exposed to the blast event monitored medium via the open bore end, and an opposite second piston end with a striker surface adjacent the bounded bore end. A ratio of an effective cross-sectional area of the detection surface of the first piston end to an effective cross-sectional area of the striker surface of the second piston end defines an amplification factor or power. It is appreciated for pneumatic piston-cylinder arrangements that the effective cross-sectional area of a piston surface under pressure is the area of a projection of the piston surface on a plane that is orthogonal to a displacement axis of the piston, for determining the magnitude of an axial force (directed along the displacement axis) exerted by the pressure on the piston surface.

The contact stress sensitive film is positioned between the strike surface of the rigid body and the striker surface of the second piston end, so that when the piston is accelerated by a blast overpressure from a blast event, the striker surface of the piston is caused to impact the contact stress sensitive film against the strike surface of the rigid body. The contact stress sensitive film is of a type which changes color in response to at least a predetermined minimum contact stress and is used to provide a visual indication of both the detection and the overpressure magnitude. In other words, a blast event which accelerates the piston to impact the film against the strike surface with at least the predetermined minimum contact stress induces a color change in the film providing visual indication that a blast overpressure encountered from the blast event was not less than the predetermined minimum threshold pressure of the sensor. Similar to the gauge of the sensor, a gauge of the film may also be identified by the predetermined minimum contact stress particularly specified for the film (e.g. a 10-gauge film would change color at not less than 10 psi contact stress). The color change may be produced using for example dye-filled microcapsules designed to rupture or burst in response to at least the predetermined minimum contact stress. As such, the predetermined minimum contact stress of any given film may also be characterized as the rupture or burst threshold. An indicator layer may also be provided so as to be stained by the dye and thereby provide visual indication that the sensor has been triggered and of the magnitude of the blast.

Arranged in this manner, the passive blast pressure sensor of the present invention is designed to be triggered by a blast overpressure having a magnitude that is not less than the predetermined minimum threshold pressure, and in particular, one that is sufficient to exert at least the predetermined minimum contact stress on the film. The predetermined minimum contact stress parameter of the film is correlated to the predetermined minimum threshold pressure parameter of the sensor as a product of the predetermined minimum threshold pressure and the amplification factor of the piston. As such, it is appreciated that both the predetermined minimum contact stress parameter and the amplification factor parameter are design parameters suitably selected in combination to achieve the particular predetermined minimum threshold pressure of the sensor. For example, a 10-gauge sensor designed to trigger at peak overpressures not less than 10 psi may employ various film gauge/amplification factor combinations, such as 10-gauge film with 1× amplification, or 20-gauge film with 2× amplification. The blast pressure sensor may be utilized as a single use, disposable device, or reusable by replacing only the contact stress sensitive film, which may be provided, for example, as a removable cartridge.

One or more blast pressure sensors may also be used together as a sensor apparatus or system, with each sensor configured to detect a predetermined minimum threshold pressure that is different from the other sensors. Because the sensors are collocated to encounter the same blast overpressure simultaneously but with different detection thresholds, blast overpressure magnitudes may be determined with a higher resolution than using a single sensor. In particular, triggering of a single sensor indicates that a blast was not less than a certain pressure value. In contrast, in a set of sensors having a range of stepped minimum threshold pressures, the magnitude of a blast overpressure which triggers some but not all of the sensors can be visually determined as being less than a lowest predetermined minimum threshold pressure of all the non-responsive (i.e. non-triggered) sensors, if any, but not less than a highest predetermined minimum threshold pressure of all responsive (i.e. triggered) sensors, if any. Thus the use of multiple sensors in this manner can indicate an overpressure range having both an upper limit and a lower limit. The blast pressure sensor of the apparatus or system may be provided as individual units capable of being arranged in parallel (taking into consideration blast directionality), or provided as a unitary device constructed from monolithically formed components having one or more piston-cylinder features. One example of such unitary device includes a first monolithic block body (which can be characterized as an integrated formation of multiple cylinder barrels) having multiple cylinder bores arranged in parallel, with individual pistons displaceably positioned in the bores, and a second monolithic block body connected to the first monolithic block body providing a common surface bounding each of the cylinder bores as strike surfaces.

In the blast pressure sensor apparatus or system, the stepped range of predetermined minimum threshold pressures may be produced in various ways, all involving variations of the film gauge/amplification ratio combinations. For example, the same film gauge may be used for all sensors, while varying only the amplification factor. Alternatively, the amplification factors of the respective sensors may be held constant, while using different film gauges. Furthermore, both the film gauges and the amplification ratios of the respective sensors may be varied to produce the gauge-differentiated sensors.

The blast pressure sensor preferably has a small form factor and footprint (e.g. quarter size pistons), and are passive in that no power is required and no electronics are necessarily employed to actively sense or monitor pressures. As such, they may be deployed anywhere and on any object or article where a quick determination of peak blast overpressure exposure might be useful. For example, the blast pressure sensors may be worn by soldiers or other potential blast victims, or placed inside or outside of vehicles in a combat environment. In particular, the sensors can be affixed or otherwise attached on the outside of a helmet, placed on/worn by a soldier or his equipment, inside of a vehicle (such as a tank) or building/room, etc. The method of attachment can vary, such as for example, with double-sided tape, conventional fasteners, hook and loop fasteners, etc.

BRIEF DESCRIPTION OF THE DRAWINGS

The accompanying drawings, which are incorporated into and form a part of the disclosure, are as follows.

DETAILED DESCRIPTION

Figure 1:
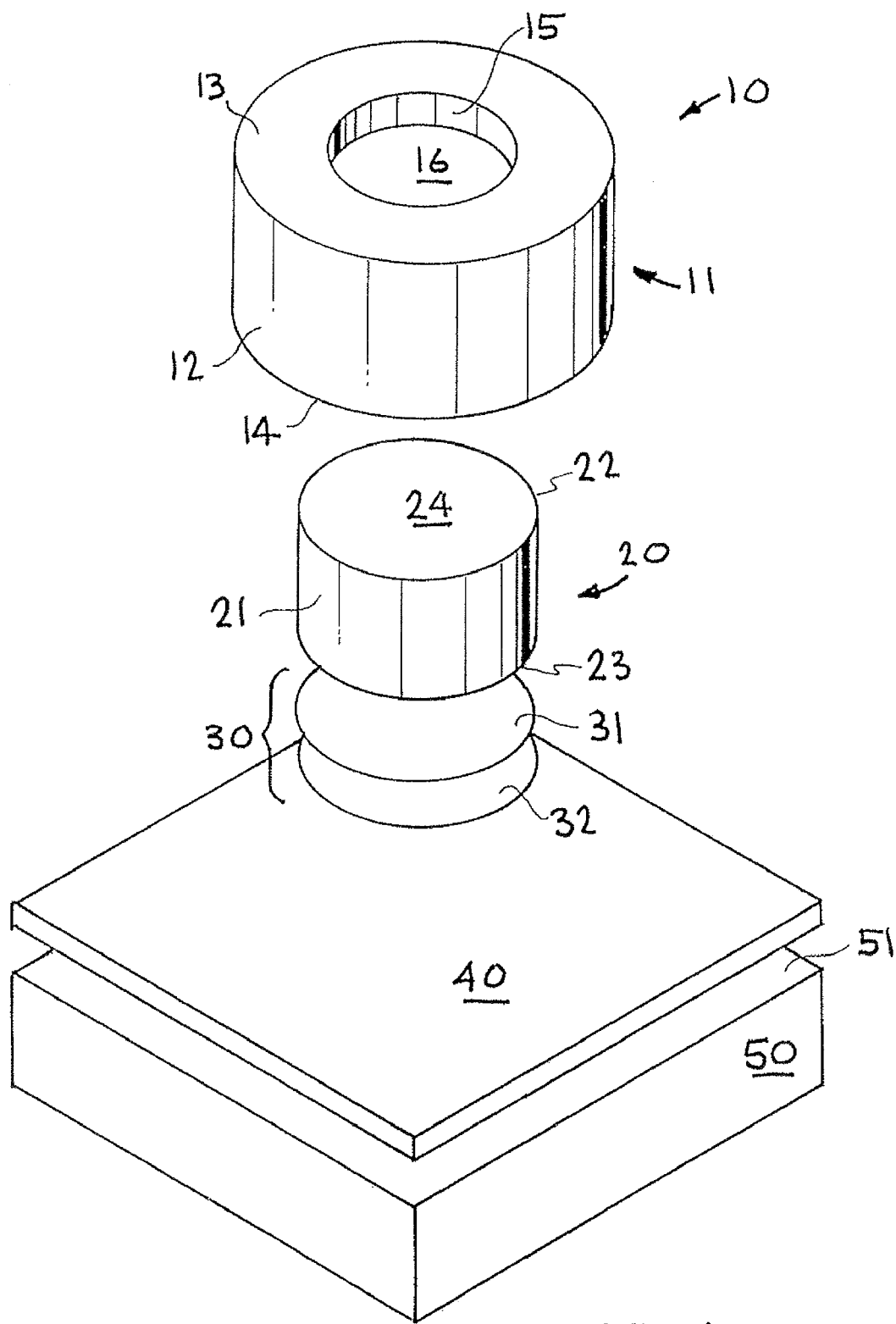
FIG. 1 is an exploded perspective view of a first exemplary embodiment of the blast pressure sensor of the present invention.
Figure 2:
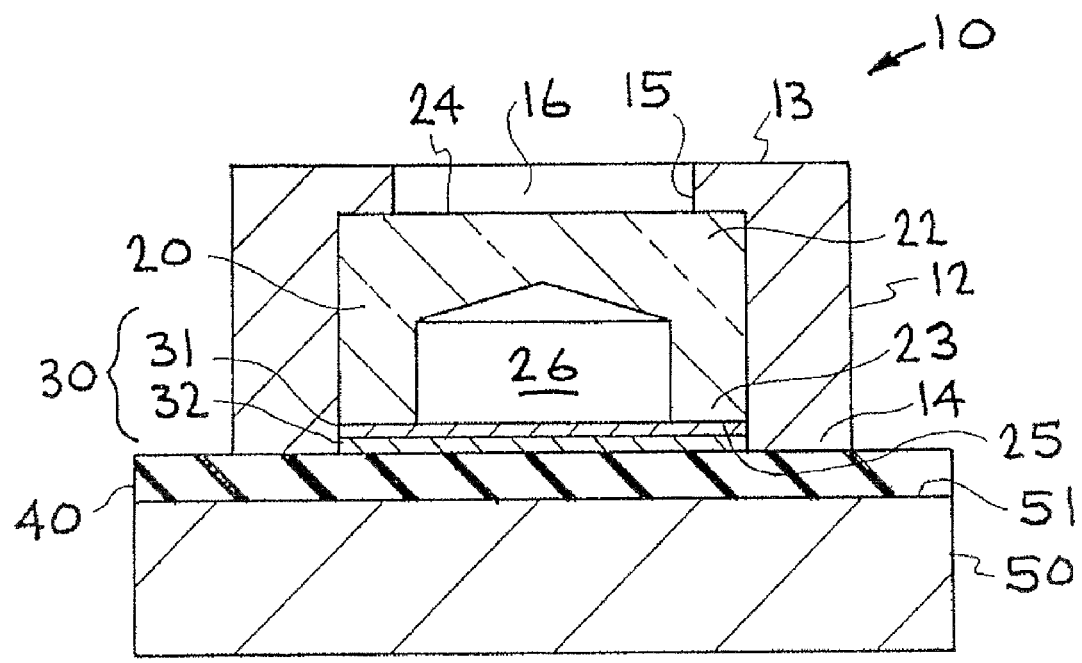
FIG. 2 is a cross-sectional assembled view of the first exemplary embodiment of FIG. 1.
Figure 3:
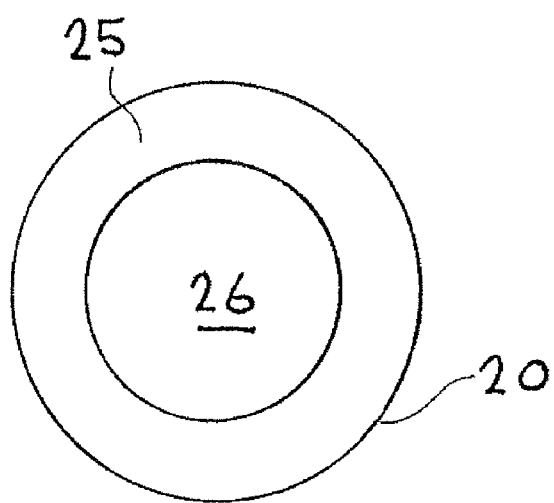
FIG. 3 is a bottom view of the button piston of the first exemplary embodiment of FIG. 2.

Turning now to the drawings, FIGS. 1-3 show a first exemplary embodiment of a blast pressure sensor of the present invention, indicated at reference character 10, and generally having a pneumatic piston-cylinder construction including a cylinder barrel 11, a piston 20 moveably guided in a cylinder bore of the cylinder barrel, a rigid body (such as back plate 40) with a strike surface 51 bounding one end of the cylinder barrel, and a contact stress sensitive film 30 positioned between the piston and the strike surface and which changes color in response to a predetermined minimum contact stress.

In particular, the cylinder barrel 11 has a cylinder wall 12 enclosing a cylinder bore which extends between a first bore end 13 and an opposite second bore end 14, both of which are open ended. The first bore end 13 of the cylinder barrel is also shown having a collar, flange or lip 15 for retaining the piston 20 in the cylinder bore, and which defines the opening 16. However, other means for retaining the piston in the bore may be utilized, such as for example a stopper pin extending from the cylinder barrel into a groove in a sidewall of the piston. In any case, because of its piston retaining functionality, the cylinder barrel itself may also be characterized as a retaining ring or collar.

And the piston 20 (also characterized as a pressure button) is shown as a short button-shaped hollow cylinder that is closed at a first piston end 22, open at an opposite second piston end 23, and surrounds a hollow volume 26. The piston is positioned in the cylinder bore so that the first piston end 22 is adjacent the first bore end 13 and the second piston end 23 is adjacent the second bore end 14. The closed first piston end 22 has an end surface at least partially exposed to a blast event monitored medium (e.g. the air) through the opening 16 at the first bore end. It is notable that the end surface, though shown partially exposed through the opening 16 due to the lip 15, may in the alternative be fully exposed through a larger opening if some other retaining means was used. It is also notable that how much the end surface is exposed may also be a function of time. In particular, though the end surface is initially partially exposed (due to the lip 15) when a blast wave is first encountered, the end surface may subsequently become fully exposed at some time after the initial encounter due to displacement of the piston. In any case, the exposed portion is defined as the detection surface 24. And the open second piston end 23 has an annular shape with a striker surface 25 positioned to impact the contact stress sensitive film 30 when accelerated by a blast overpressure encountered at the detection surface 24. In an exemplary embodiment, the piston is constructed of a transparent material (such as for example, acrylic), so when the film changes color, a user can see the color change without disassembling or otherwise handling the sensor.

The contact stress sensitive film 30 is positioned between the strike surface 51 of the rigid body and the striker surface 25 of the second piston end 23, so that when the piston is accelerated by a blast overpressure from a blast event, the striker surface of the piston is caused to impact the contact stress sensitive film against the strike surface of the rigid body. The contact stress sensitive film 30 is generally of a type which produces a color change in the film in response to a predetermined minimum contact stress between solids. The film may be pre-fabricated as a multi-layered tape, or may comprise separate individual layers which may be stacked together at the time of assembly or re-loading of the sensor. In an example embodiment, the film contains dye-filled packets (e.g. dye-filled microcapsules) designed to rupture under (in response to) the predetermined minimum contact stress (burst threshold) so as to produce a color change which visually indicates a triggering/detection event. And an indicator layer (e.g. developer film) may be used in conjunction with the dye layer, so as to be stained by the ruptured dye. Various types of contact stress sensitive films known in the art may be utilized for this purpose, such as for example contact stress sensitive tape available from Sensor Products Inc. of Madison N.J. As shown in FIGS. 1 and 2, two layers 31 and 32 are shown comprising the film 30. The bottom layer 32 is preferably the contact stress sensitive dye layer, and the top layer 32 is preferably the indicator layer which is stained by the dye layer when ruptured and is viewable through the preferably transparent piston. It is appreciated that while the sensor may be used as a "single use" disposable device (whereupon the sensor is disposed after a triggering event), the sensor may also be reused by replacing only the film, as a replaceable cartridge. It is also appreciated that a MEMS-type contact stress gauge (such as described in for example U.S. Pat. No. 7,311,009) may also be used in conjunction with or in place of the contact stress sensitive film, to measure a pressure time history.

FIGS. 1 and 2 also show an elastomeric layer 40 placed between the film 30 and the strike surface 51 of the back plate 50 which may optionally be used to control the sensitivity of the contact stress sensitive film. The elastomeric layer 40 is shown positioned against the strike surface 50 of the back plate 50, with the cylinder barrel connected to the elastomeric layer 40. Double sided adhesive tape may be used to attach the elastomeric layer to the strike surface, as well as attach the cylinder barrel to the elastomeric layer. However, other suitable means for attachment may be employed, such as for example, adhesives, fasteners, hook-and-loop, rivets, screws, etc. It is appreciated that while the elastomeric layer 40 is shown as being separate from the film 30 in FIGS. 1 and 2, it may in the alternative be combined with and considered part of the film 30. Furthermore, the elastomeric film may be sized to be equivalent to the film 30, so that the cylinder barrel 11 may be directly connected to the back plate 50. Because the elastomeric layer is considered optional, the film 30 is characterized herein and in the claims as being positioned between the striker surface of second piston end and the strike surface of the back plate.

FIGS. 1-3 also illustrate a second exemplary embodiment of the present invention and generally having the pneumatic piston-cylinder construction and the contact stress sensitive film of the first exemplary embodiment described above, but not necessarily including the rigid body or its strike surface. In this case, the contact stress sensitive film can be positioned adjacent the second bore end of the cylinder and/or adjacent the striker surface of the second piston end. Suitable means for attaching the film to either the cylinder barrel or the striker surface may be employed, such as for example double-sided adhesive tape. Furthermore, in this embodiment, a suitable means for securing the cylinder barrel to a rigid body having a strike surface is utilized so that the film is positioned between the strike surface of the rigid body and the striker surface of the second piston end and the first open bore end is open to the blast event monitored medium. The securing means may include for example, fasteners, tape, adhesive, screws, etc. And the rigid body may be any object or location having a strike surface, such as for example a helmet or a tank surface.

Arranged in this manner, the piston 20 of FIGS. 1-3 may be accelerated by a blast overpressure encountered at the detection surface 24 so that the striker surface 25 of the piston impacts the film 30 against the strike surface 51 of the rigid body or back plate 50. A color change induced in the film 30 will indicate that the blast overpressure was at least the predetermined minimum threshold pressure, and the contact stress exerted on the film was at least the predetermined minimum contact stress. In addition, because the detection surface 24 of the piston has a larger effective cross-sectional area than the annular striker surface 25, the piston will amplify the blast overpressure encountered on its detection surface by the amplification factor (which will be greater than 1×). Furthermore, because the cavity inside the cylindrical piston is not sealed, slow pressure changes (i.e. due to changes in elevation or weather-related atmospheric changes) will not trigger the device, because the pressure inside the piston will balance the pressure acting on its outer face. However, the cavity pressure cannot respond quickly enough to the rapid pressure changes associated with a blast wave, so the device can distinguish between blast loadings and slow static pressure changes (e.g. atmospheric changes due to weather).

Figure 4:
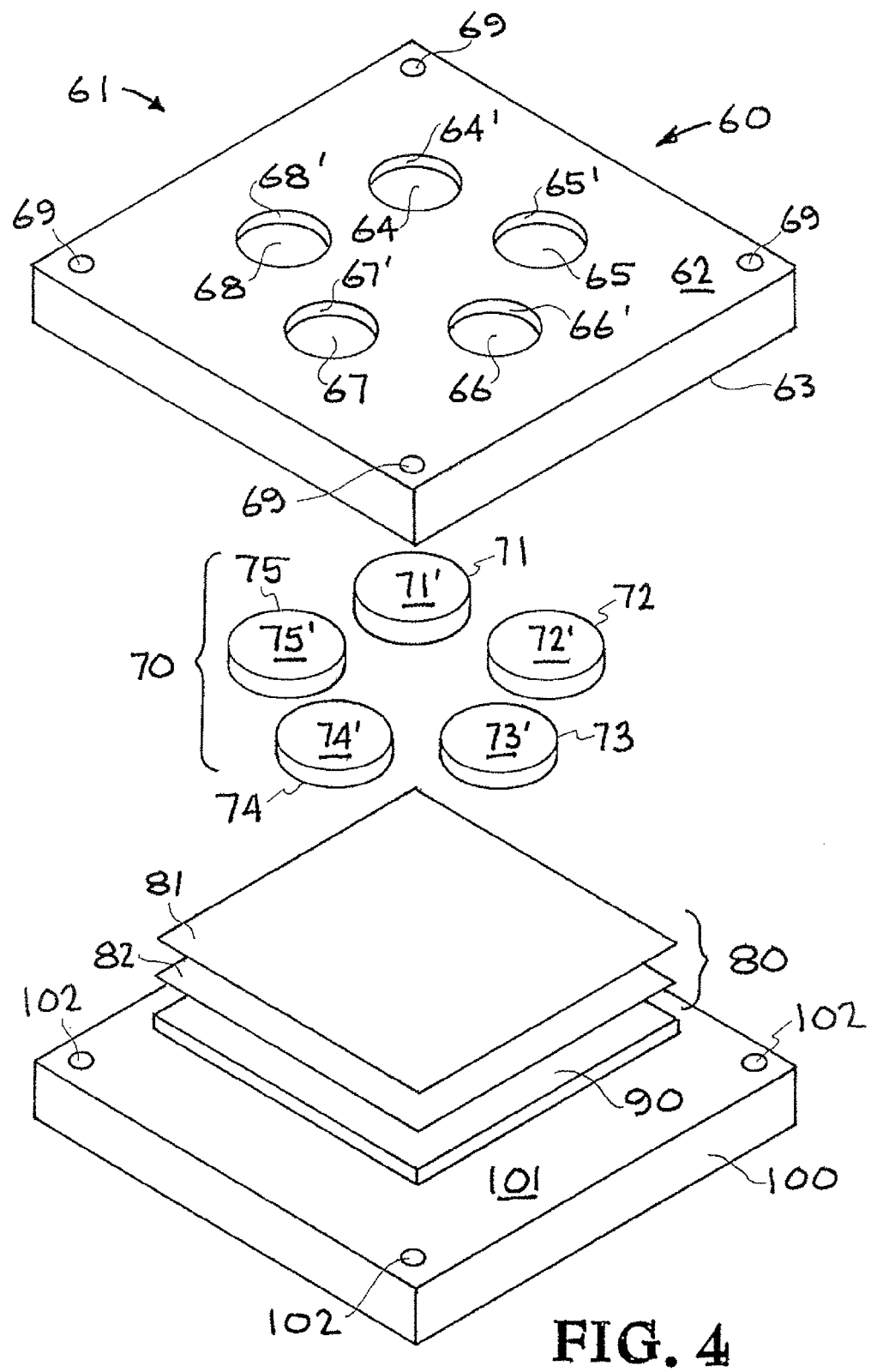
FIG. 4 is an exploded perspective view of a second exemplary embodiment of a blast pressure sensor apparatus of the present invention having five blast pressure sensors integrated into a single unit.
Figure 5:
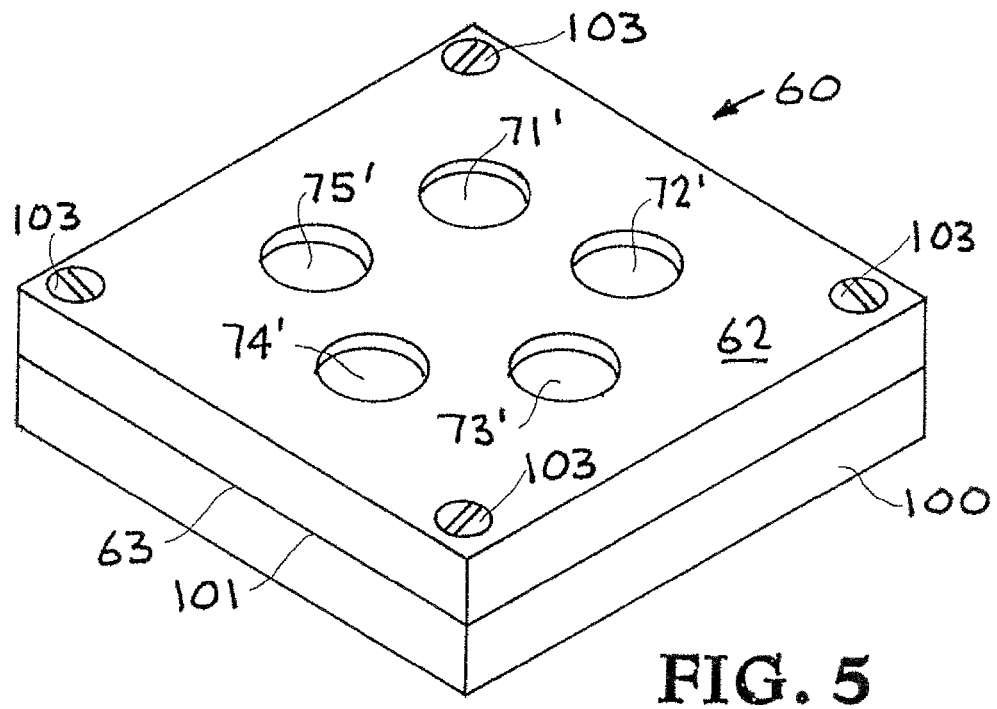
FIG. 5 is a perspective assembled view of the second exemplary embodiment of FIG. 4.
Figure 6:
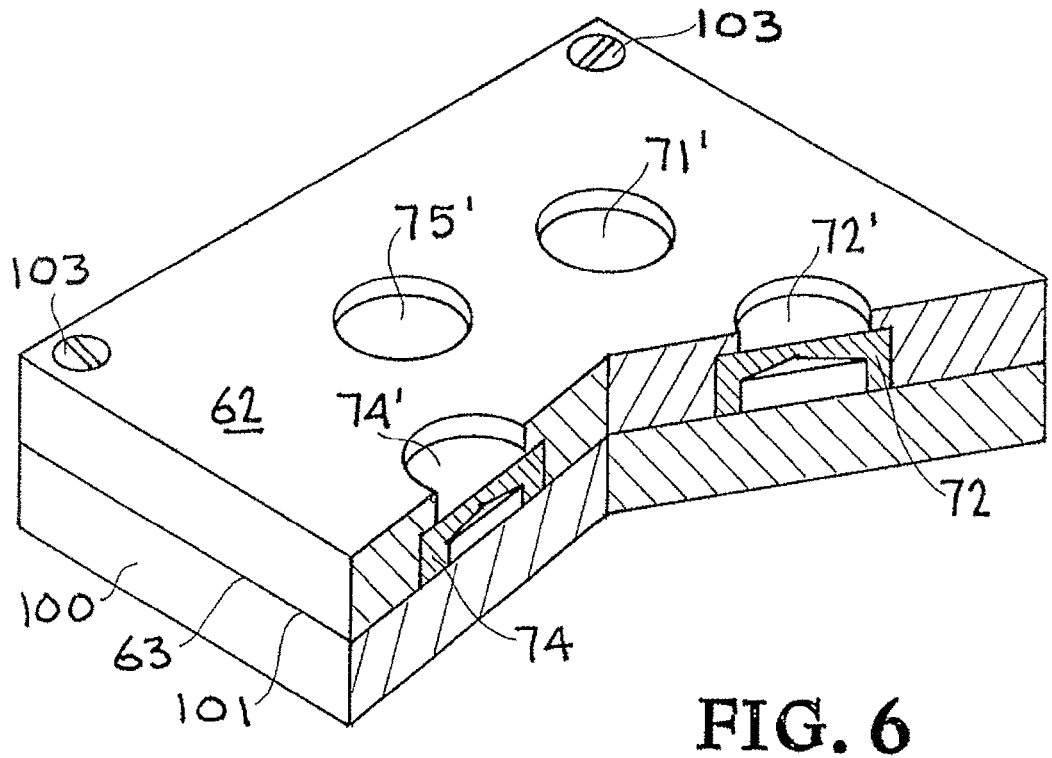
FIG. 6 is a partial cutaway view of the second exemplary embodiment of FIG. 5.

FIGS. 4-6 illustrate another embodiment of a blast pressure sensor apparatus/system of the present invention, generally indicated at reference character 60, integrating multiple blast pressure sensors together, with each sensor configured to detect a predetermined minimum threshold pressure that is different from the other sensors. In particular, the sensor apparatus is shown having a single back plate 100 with a strike surface 101. An elastomeric sheet 90 is positioned against the strike surface, followed by a dye sheet 82 and an indicator sheet 81. The contact stress sensitive film 80 may be characterized as comprising the indicator sheet and the dye sheet together, as shown in FIG. 4, or additionally including the elastomeric sheet 90. In any case, the film is positioned and held between the back plate 100 and a top retaining plate 61. The retaining plate is shown as a monolithic body having an outer surface 62, an opposite inner surface 63, and five open-ended bores or recesses extending between the outer and inner surfaces. The retaining plate may be characterized as an integrated formation of multiple cylinder barrels arranged in parallel. The sensor apparatus also includes a set of pistons (71-75) moveably guided in the respective bores. The openings 64-68 of the respective bores at the outer surface of the retaining plate are surrounded by retaining flanges 64'-68', respectively, which have smaller diameters than the pistons, for retaining the pistons in the bores. And the pistons 71-75 have respective first piston end surfaces adjacent the openings 64-68 with at least a portion of the end surfaces (i.e. detection surfaces 71'-75') exposed through the openings 64-68. And second piston ends with striker surfaces (not shown) are positioned adjacent the film 80. The retaining plate may also have a recessed cavity (not shown) cut for placement of the film between the back plate and all five sensors. The retaining plate and the back plate are shown machined with mounting holes 69 and 102, respectively, so that fasteners, such as bolts 103, may be used to fixedly connect the two plates together. When connected, the back plate provides a common surface bounding each of the cylinder bores as strike surfaces. By co-locating the sensors in this manner, a blast overpressure may be encountered by all sensors simultaneously and with a higher resolution than with a single sensor, in particular by indicating an overpressure range having both an upper limit and a lower limit.

In the blast pressure sensor apparatus or system, the stepped range of predetermined minimum threshold pressures may be produced in various ways, all involving variations of the film gauge/amplification ratio combinations. For example, in a first scenario, the amplification factors of the respective sensors may be held constant, while using different film gauges. Alternatively, in a second scenario, the same film gauge may be used for all sensors, while varying only the amplification factor. Furthermore, both the film gauges and the amplification ratios of the respective sensors may be varied to produce the gauge-differentiated sensors. In the first scenario, a 1× amplification factor can be chosen so that the pressure encountered at the detection surface is the same magnitude as the contact stress exerted on the film. By providing different film gauges for the respective sensors, different minimum threshold pressures may be detected.

Figure 7:
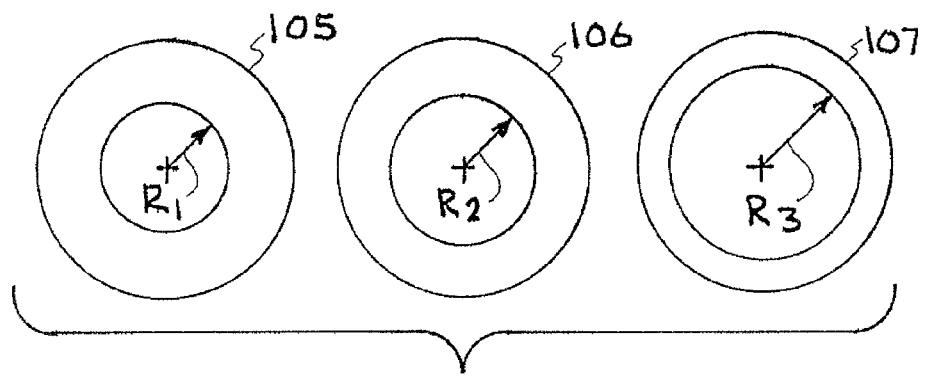
FIG. 7 is a bottom view of three example pistons of the present invention with different amplification factors produced by varying the effective cross-sectional areas for the respective annular striker surfaces (by varying wall thicknesses) while keeping the effective cross-sectional areas for the respective detection surfaces the same.
Figure 8:
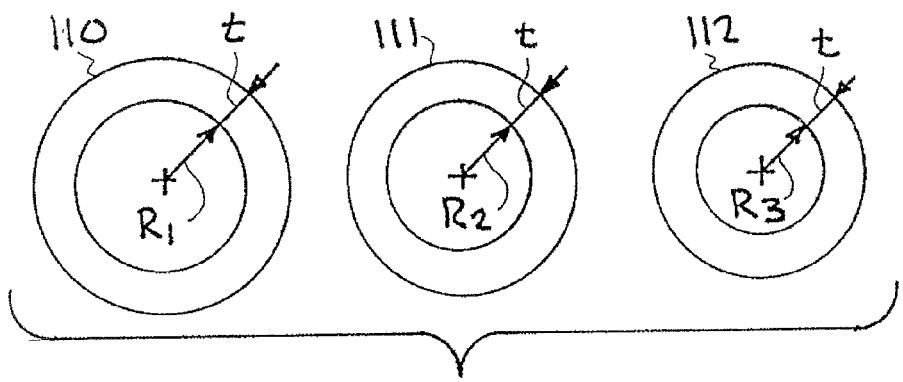
FIG. 8 is a bottom view of three example pistons of the present invention with different amplification factors produced by varying the effective cross-sectional areas of the respective detection surfaces and the effective cross-sectional areas of the respective annular striker surfaces.
Figure 9:
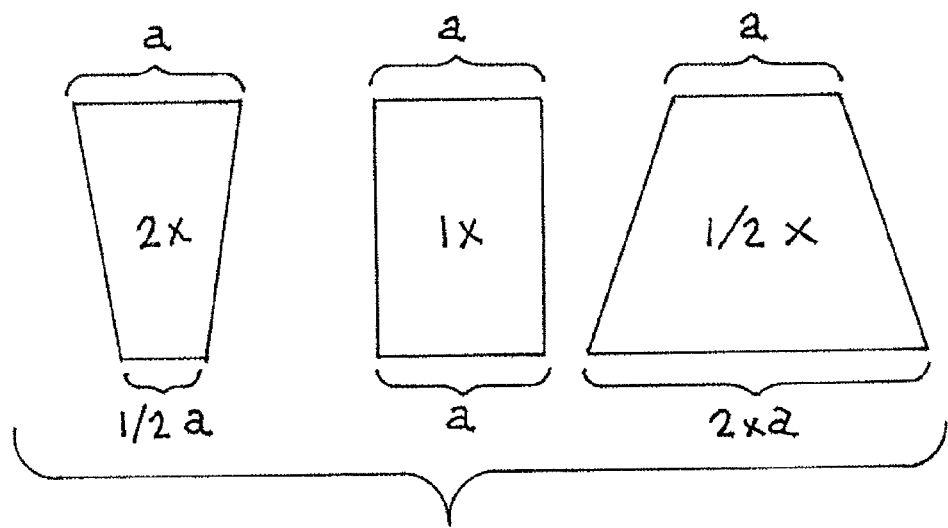
FIG. 9 is a schematic side view three example pistons of the present invention with different amplification factors produced by varying the effective cross-section areas of the circular striker surfaces while keeping the effective cross-sectional areas for the respective detection surfaces the same.

FIGS. 7-9 show variations on the second scenario, involving using the same film gauge across all sensors, while varying only the amplification factor. In particular, FIG. 7 is a bottom view of three example pistons 105-107 of the present invention with different amplification factors produced by varying the effective cross-sectional areas for the respective annular striker surfaces (by varying wall thicknesses) while keeping the effective cross-sectional areas for the respective detection surfaces the same. As can be seen, each of the pistons have the same outer diameter, and as such have a closed end with a detection surface having the same effective cross-sectional area. However, the striker surfaces shown in FIG. 7 each have an annular configuration with an inner radius that increase from pistons 105 to 107, which reduces its wall thickness. In particular, piston 105 has an inner radius $R_1$ less than an inner radius $R_2$ of piston 106 less than an inner radius $R_3$ of piston 107. Because of the reduction in effective cross-sectional area of the striker surfaces form pistons 105 to 107, the amplification factor consequently increases, with piston 107 capable of detecting a lower pressure than piston 106, and piston 106 capable of detecting a lower pressure than piston 105. Thus the amplification factor can be varied by changing the wall thickness of the piston cylinder relative to its total diameter, with thinner walls resulting in a greater amplification.

FIG. 8 is a bottom view of three example pistons 110-112 of the present invention with different amplification factors produced by varying the effective cross-sectional areas of the respective detection surfaces and the effective cross-sectional areas of the respective annular striker surfaces. In particular, variation in the amplification factor is produced by varying the outer radius of the piston (at both ends), while keeping the thickness t of the annulus (striker surface) on the second piston end constant. This makes reading the gage easier, with the smallest colored ring on the tape having the greatest amplification. Thus by keeping all the wall thicknesses the same for every sensor, the largest radius sensor (with $R_1$) will have the largest amplification factor, and the smallest radius sensor will have the smallest amplification factor.

And FIG. 9 is a schematic side view three example pistons of the present invention with different amplification factors produced by varying the effective cross-section areas of the circular striker surfaces while keeping the effective cross-sectional areas for the respective detection surfaces the same. In particular, the effective cross-section area of each detection surface is shown as area, a. And the effective cross-sectional areas of the striker surfaces is shown as areas ½a, a, and 2a. Using the same film gauge for all sensors, if a blast overpressure of 10 psi detected by the center piston, then a blast overpressure of 5 psi would be detectable by the left piston, and a blast overpressure of 20 psi would be detectable by the right piston.

While particular operational sequences, materials, parameters, and particular embodiments have been described and or illustrated, such are not intended to be limiting. Modifications and changes may become apparent to those skilled in the art, and it is intended that the invention be limited only by the scope of the appended claims.

We claim:

1. A blast pressure sensor for detecting blast overpressures of at least a predetermined minimum threshold pressure, said blast pressure sensor comprising:
a base with a strike surface;
a cylinder barrel having a cylinder bore with a first bore end open to a blast event monitored medium and a second bore end bounded by the strike surface;
a piston movably guided in the cylinder bore and having a first piston end with a detection surface exposed to the blast event monitored medium via the first bore end, and a second piston end with a striker surface adjacent the second bore end, wherein a ratio of an effective cross-sectional area of the detection surface of the first piston end to an effective cross-sectional area of the striker surface of the second piston end defines an amplification factor; and
a contact stress sensitive film positioned between the strike surface of the base and the striker surface of the second piston end and which changes color in response to at least a predetermined minimum contact stress defined as a product of the predetermined minimum threshold pressure and the amplification factor,
whereby a blast event which accelerates the piston to impact the film against the strike surface with at least the predetermined minimum contact stress induces a color change in the film providing visual indication that a blast overpressure encountered from the blast event was not less than the predetermined minimum threshold pressure.

2. The blast pressure sensor of claim 1,
wherein the piston is transparent so that a color change of the contact stress sensitive film is viewable externally.

3. The blast pressure sensor of claim 1,
wherein the contact stress sensitive film comprises an indicator layer and a contact stress sensitive dye layer containing a dye arranged to stain and thereby change the color of the indicator layer in response to at least the predetermined minimum contact stress.

4. A blast pressure sensor for detecting blast overpressures of at least a predetermined minimum threshold pressure, said blast pressure sensor comprising:

a cylinder barrel having a cylinder bore with first and second open bore ends;

a piston movably guided in the cylinder bore and having a first piston end with a detection surface exposed through the first open bore end and a second piston end with a striker surface adjacent the second open bore end, wherein a ratio of an effective crosssectional area of the detection surface of the first piston end to an effective cross-sectional area of the striker surface of the second piston end defines an amplification factor;

a contact stress sensitive film which changes color in response to at least a predetermined minimum contact stress defined as a product of the predetermined minimum threshold pressure and the amplification factor; and means for securing the cylinder barrel to a rigid body so that the film is positioned between a strike surface of the rigid body and the striker surface of the second piston end and the first open bore end is open to a blast event monitored medium;

whereby a blast event which accelerates the piston to impact the film against the strike surface with at least the predetermined minimum contact stress induces a color change in the film providing visual indication that a blast overpressure encountered from the blast event was not less than the predetermined minimum threshold pressure.

5. The blast pressure sensor of claim 4, wherein the piston is transparent so that a color change of the contact stress sensitive film is viewable externally.

6. The blast pressure sensor of claim 4, wherein the contact stress sensitive film comprises an indicator layer and a contact stress sensitive dye layer containing a dye arranged to stain and thereby change the color of the indicator layer in response to at least the predetermined minimum contact stress.

7. The blast pressure sensor of claim 4, further comprising the rigid body wherein the rigid body is a back plate.

8. A blast pressure sensor apparatus comprising:

a plurality of blast pressure sensors, each sensor for detecting blast overpressures of at least a corresponding predetermined minimum threshold pressure and each sensor comprising: a base with a strike surface; a cylinder barrel having a cylinder bore with a first bore end open to a blast event monitored medium and a second bore end bounded by the strike surface; a piston movably guided in the cylinder bore and having a first piston end with a detection surface exposed to the blast event monitored medium via the first bore end, and a second piston end with a striker surface adjacent the second bore end, wherein a ratio of an effective cross-sectional area of the detection surface of the first piston end to an effective cross-sectional area of the striker surface of the second piston end defines an amplification factor; and a contact stress sensitive film positioned between the strike surface of the base and the striker surface of the second piston end and which changes color in response to at least a predetermined minimum contact stress defined as a product of the corresponding predetermined minimum threshold pressure of the sensor and the amplification factor, whereby a blast event which accelerates the piston to impact the film against the strike surface with at least the predetermined minimum contact stress induces a color change in the film providing visual indication that a blast overpressure encountered from the blast event was not less than the corresponding predetermined minimum threshold pressure of the sensor, and wherein the respective predetermined minimum threshold pressures of the sensors are different from each other so as to provide visual indication that the blast overpressure encountered from the blast event is less than a lowest predetermined minimum threshold pressure of all non-responsive sensors, if any, but not less than a highest predetermined minimum threshold pressure of all responsive sensors, if any.

9. The blast pressure sensor of claim 8, wherein the pistons of the respective sensors are transparent so that color changes of the respective contact stress sensitive films are viewable externally.

10. The blast pressure sensor of claim 8, wherein the respective contact stress sensitive films of the sensors each comprise an indicator layer and a contact stress sensitive dye layer containing a dye arranged to stain and thereby change the color of the indicator layer in response to at least the predetermined minimum contact stress.

11. The blast pressure sensor of claim 8, wherein the respective amplification factors of the sensors are the same while the respective predetermined minimum contact stress values of the sensors are different.

12. The blast pressure sensor of claim 8, wherein the respective predetermined minimum contact stress values of the sensors are the same while the respective amplification factors of the sensors are different.

13. The blast pressure sensor of claim 12, wherein the respective striker surfaces of the second piston ends of the sensors have annular configurations with a same outer diameter and different inner diameters.

14. The blast pressure sensor of claim 8, wherein the respective cylinder barrels of the sensors are integrally formed as a first monolithic body and the respective cylinder bores extend in parallel through the first monolithic body.

15. The blast pressure sensor of claim 14, wherein the respective bases of the sensors are integrally formed as a second monolithic body.

* * * * *